(12) United States Patent
Suto et al.

(10) Patent No.: US 9,747,399 B2
(45) Date of Patent: Aug. 29, 2017

(54) METHOD AND APPARATUS FOR PROVIDING RULE PATTERNS ON GRIDS

(71) Applicant: Intel Corporation, Santa Clara, CA (US)

(72) Inventors: Gyorgy Suto, Hillsboro, OR (US); Aaron B. Kohlmeier, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 14/861,020

(22) Filed: Sep. 22, 2015

(65) Prior Publication Data

US 2017/0083638 A1    Mar. 23, 2017

(51) Int. Cl.
*G06F 17/50* (2006.01)

(52) U.S. Cl.
CPC ........ *G06F 17/505* (2013.01); *G06F 17/5072* (2013.01); *G06F 17/5077* (2013.01)

(58) Field of Classification Search
CPC ............ G06F 17/5068; G06F 17/5081; G06F 17/5072; G06F 17/50; G06F 17/5045; G06F 2217/12; G06F 11/3664; G06F 17/30958; G06F 17/30961; G06F 17/5031; G06F 17/505; G06F 2217/02; G06F 2217/06; G06F 2217/74; G06F 2217/82; G06F 8/443
See application file for complete search history.

(56) References Cited

U.S. PATENT DOCUMENTS

| | | | | |
|---|---|---|---|---|
| 6,212,666 B1 * | 4/2001 | Gohl | .................. | G06F 17/5031 716/108 |
| 6,915,252 B1 * | 7/2005 | Li | ............................ | G06F 17/50 703/1 |
| 8,156,456 B1 * | 4/2012 | Rahman | .............. | G06F 17/5068 703/16 |
| 9,298,871 B1 * | 3/2016 | Fallon | ................. | G06F 17/5072 |
| 2004/0111406 A1 * | 6/2004 | Udeshi | ............. | G06F 17/30961 |
| 2006/0038201 A1 * | 2/2006 | Shinomiya | .......... | G06F 17/5081 257/206 |
| 2006/0075379 A1 * | 4/2006 | Kamat | ................ | G06F 17/5068 716/53 |
| 2006/0143589 A1 * | 6/2006 | Horng | ................. | G06F 17/5072 716/53 |
| 2009/0319579 A1 * | 12/2009 | Pikus | .................. | G06F 17/5045 |
| 2011/0016444 A1 * | 1/2011 | Paris | .................... | G06F 17/5081 716/111 |
| 2011/0145772 A1 * | 6/2011 | Pikus | .................. | G06F 17/5045 716/112 |
| 2011/0265055 A1 * | 10/2011 | Gray | .................... | G06F 17/5068 716/119 |

(Continued)

*Primary Examiner* — Nha Nguyen
(74) *Attorney, Agent, or Firm* — Green, Howard & Mughal LLP

(57) ABSTRACT

Described is a machine-readable storage media having one or more machine executable instructions stored there on that when executed cause one or more processors to perform an operation comprising: define properties of a layout grid, wherein the layout grid provides a three dimensional (3D) space for organizing a plurality of objects on the layout grid; and define rules for the plurality of objects, wherein the rules define a relationship between the plurality of objects with reference to the defined properties of the layout grid.

17 Claims, 11 Drawing Sheets

(56) References Cited

U.S. PATENT DOCUMENTS

| | | | |
|---|---|---|---|
| 2012/0144355 A1* | 6/2012 | Dai | G06F 17/5081 716/112 |
| 2012/0227023 A1* | 9/2012 | Bendicksen | G06F 17/5081 716/112 |
| 2013/0111418 A1* | 5/2013 | Chen | G06F 17/5081 716/52 |
| 2015/0143309 A1* | 5/2015 | De Dood | G06F 17/5068 716/107 |
| 2015/0213177 A1* | 7/2015 | De Dood | G06F 17/5068 716/122 |
| 2015/0248514 A1* | 9/2015 | Salodkar | G06F 17/5068 716/107 |
| 2015/0261881 A1* | 9/2015 | Wensel | G06F 9/4436 707/798 |
| 2016/0055283 A1* | 2/2016 | Oh | G06F 17/5072 716/112 |

* cited by examiner

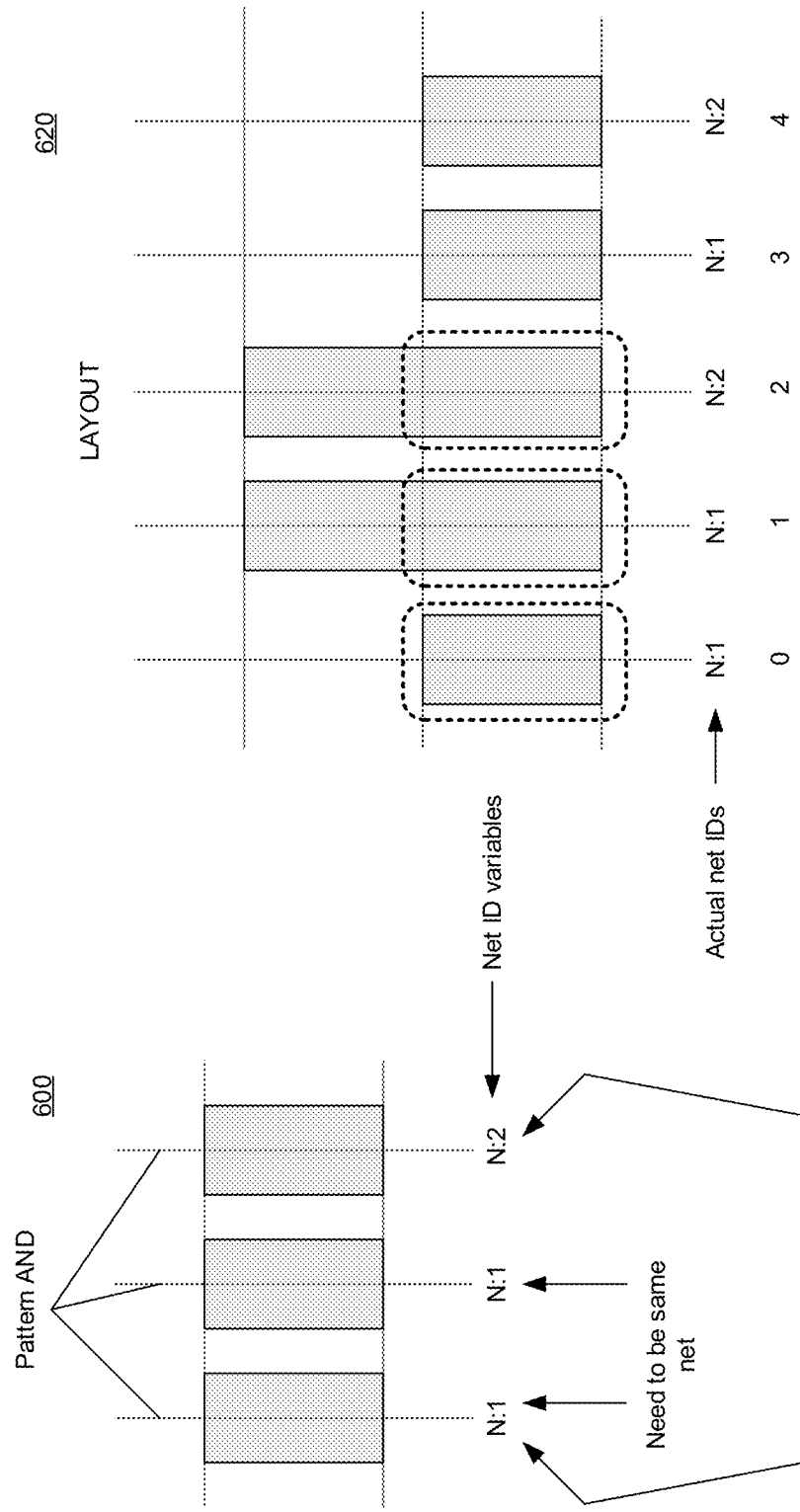

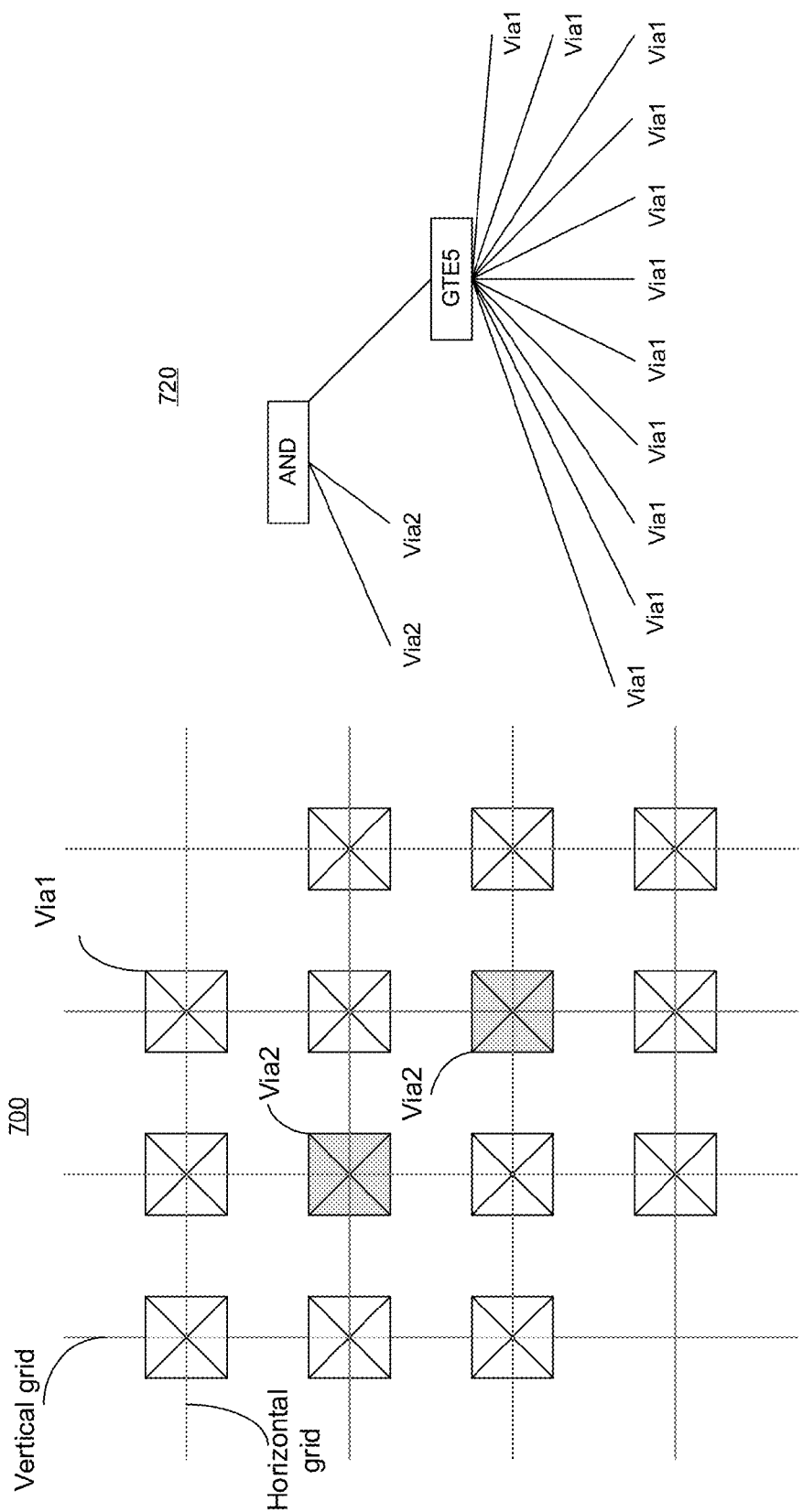

METHOD AND APPARATUS FOR PROVIDING RULE PATTERNS ON GRIDS

BACKGROUND

Physical design rules traditionally governed the spacing between two metal wires or two vias. However, with the ever-shrinking process nodes (e.g., 10 nm and 7 nm process nodes) physical design rules may involve up to twenty neighboring objects and this number is expected to grow with future process nodes. Mainstream Electronic Design Automation (EDA) Computer Aided Design (CAD) tools models usually build on edge to edge, corner to corner, intersection, and containment pairwise relationships between the layout objects. These models are stretched far beyond their planned scope and capability, resulting in either dumbing down of the process capabilities so that the tools can somehow comprehend and deal with the rules, or requiring significant effort to customize the CAD tools' models with each generation, both of which impact density and/or design turn-around-time.

There are several models for design rules written and supported by various external CAD tools and standards bodies, namely the Si2 (Silicon Integration Initiative) OpenDFM standard. The OpenDFM standard Version 2.0 describes an open, high-level language that can generate popular verification run-sets for use in an EDA design for manufacturability (DFM) verification. However, those standards cannot, and do not, keep up with evolving process technologies and repeatedly fail to provide adequate models for the CAD tools.

FIG. 1 illustrates a typical framework 100 for EDA CAD tools. Here, various CAD tools (e.g., $CAD_1$ through $CAD_N$) may be from different vendors and each CAD tool may have a designated support team (e.g., $Team_1$ through $Team_N$, respectively). Each team may review the various Process node layout rules 101 (which are usually proprietary rules) and develops code for their respective CAD tools so that the CAD tools can comprehend rules 101. When the process rules change, the teams have to re-review the tools and update their respective CAD tools again so that that the CAD tools can comprehend the rule changes.

Standards such as OpenDFM and frameworks such as framework 100 force CAD tool developers to write all kinds of hard-coded hacks to cope with the changing rules, or just plainly not support the more advanced process features offered by a process node.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 6A-B illustrate an RPG pattern and layout that meets the rule on equality variables, according to some embodiments of the disclosure.

FIGS. 7A-B illustrate a grid with instances of payloads, and associated rules modeled in RPG, in accordance with some embodiments of the disclosure.

DETAILED DESCRIPTION

Figure 2:
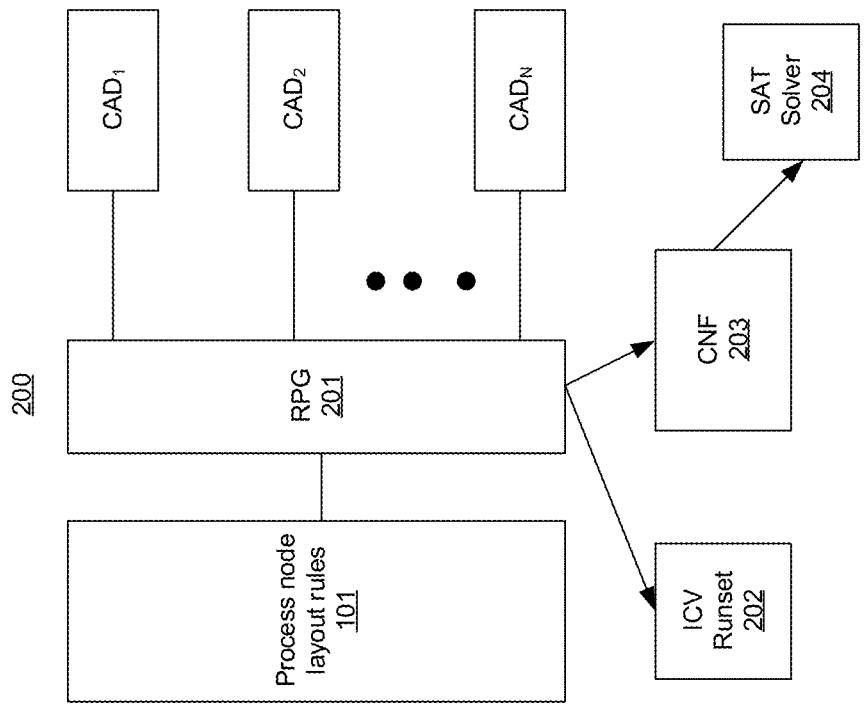
FIG. 2 illustrates a framework for EDA CAD tools using Rule Patterns on Grid (RPG), in accordance with some embodiments of the disclosure.
Figure 1:
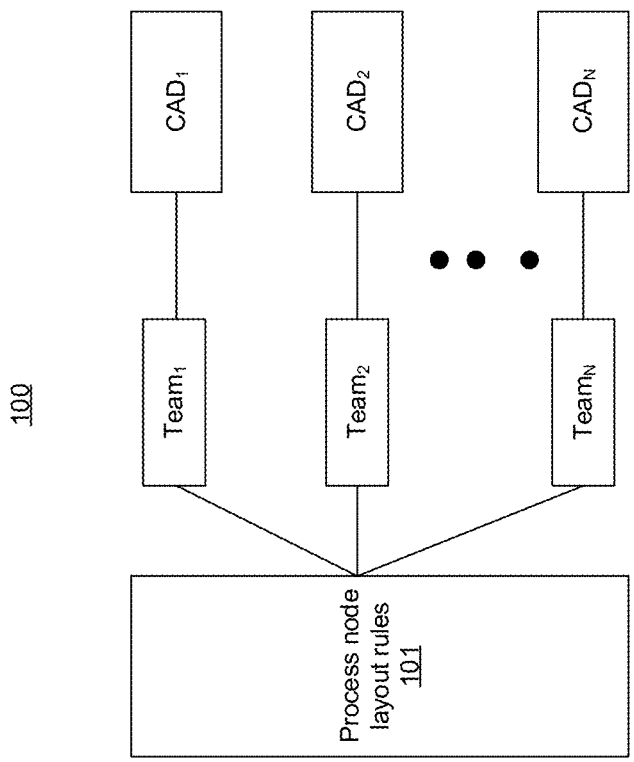
FIG. 1 illustrates a typical framework for Electronic Design Automation (EDA) Computer Aided Design (CAD) tools.

Some embodiments describe a method and apparatus for providing Rules Patterns on Grid (RPG). The method and apparatus described here, in accordance with some embodiments, define arbitrarily complex design rules between any numbers of layout objects and provides an abstraction or generalization for CAD tools. The various embodiments described here operate on layout objects on a grid. In some embodiments, the method and apparatus described here not just check for pattern matching, but also provide hints for fixing the layout patterns. In some embodiments, the method described here converts the rules directly into Boolean satisfiability solvers (SAT).

The RPG of various embodiments provides a unified interface of complex design rules to various CAD tools. As such, the RPG of various embodiments described here decouples the CAD tools from the process rules and allows full and accurate support of new process nodes (with new rules) without the need to re-write the CAD tools. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

For purposes of the embodiments, the transistors in various layouts described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), dynamic-VT FeFETs, dynamic-VT nanocrystal based FETs, or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors—BJT PNP/NPN, BiCMOS, CMOS, eFET, etc., may be used without departing from the scope of the disclosure.

FIG. 2 illustrates framework 200 for EDA CAD tools using RPG interface, in accordance with some embodiments of the disclosure. It is pointed out that those elements of FIG. 2 having the same reference numbers (or names) as the elements of any other figure can operate or function in any manner similar to that described, but are not limited to such.

In some embodiments, framework 200 comprises RPG 201 that provides a unified interface of Process node layout rules 101 to one or more kinds of CAD tools (e.g., $CAD_1$ through $CAD_N$, where 'N' is greater than one). Process node layout rules 101 may be proprietary rules such as rules for minimum and maximum distances between the centers of two neighboring vias, rules for minimum distance between a gate region of a transistor and its source/drain region contact, etc.

Here, CAD tools can be any kind of CAD tools that need process node layout rules to perform their function. For example, $CAD_1$ may be a layout synthesis tool that reads a set of instructions for forming a logic and generates a corresponding layout. In another example, $CAD_2$ may be a custom layout design tool for drawing layout of various circuits and logic while CADS may be a place-and-route tool to route interconnects between various logic blocks.

In some embodiments, RPG 201 is to layout what regular expressions are to strings. In some embodiments, RPG 201 allows the definition of arbitrarily complex patterns in three dimension (3D) space that can be used for searching (i.e., pattern matching), correcting layout (i.e., fixing violations in layout) as well as synthesizing layout (i.e., layout generation from scratch).

In some embodiments, RPG 201 implements a pattern expression as a Directed Acyclic Graph (DAG), having leaf nodes and nodes. Here, pattern expression defines a pattern of objects (also referred to as payloads) as a spatial and Boolean expression between any arbitrary numbers of payloads. The term "payload" generally refers to layout object(s) (e.g., wires, vias, contacts, devices, etc.) associated with components of a grid. The term "grid" generally refers to a payload placing tool defined with components such as offsets between grid lines, periods of the gridlines, etc. In some embodiments, the leaf nodes of the DAG comprise payloads with relative spatial information (e.g., how far a payload can be from another payload on the same or another grid). In some embodiments, the nodes of DAG implement the Boolean multiary logic functions (e.g., AND, OR, less than (LT), greater than (GT), exclusive-or (XOR)) and unary logic functions (e.g., JUST, NOT, where "JUST" is the non-negated version while "NOT" is the negated version).

In some embodiment RPG 201 also interfaces with other tools. For example, RPG 201 interfaces with Integrated Circuit Validation (ICV) Runset tool 202. This tool is used for validating circuit connections and/or logic using the layout database of a logic block. In another example, RPG 201 interface with Conjunctive Normal Form (CNF) based Boolean logic formula 203. CNF is a formula in Boolean logic. CNF is also referred to as clausal normal form if it is a conjunction of clauses, where a clause is a disjunction of literals (e.g., AND of ORs). In some embodiments, Boolean constrains in CNF 203 are fed to a satisfiability (SAT) solver 204.

Boolean Satisfiability Problem (sometimes called Propositional Satisfiability Problem and abbreviated as SATISFIABILITY or SAT) is the problem of determining if there exists an interpretation that satisfies a given Boolean formula. It asks whether the variables of a given Boolean formula can be consistently replaced by the values TRUE or FALSE in such a way that the formula evaluates to TRUE. If the formula evaluates to TRUE, the formula is called satisfiable. Conversely, if no such assignment exists, the function expressed by the formula is identically FALSE for all possible variable assignments and the formula is unsatisfiable. For example, the formula "a AND NOT b" is satisfiable because one can find the values a=TRUE and b=FALSE, which make (a AND NOT b)=TRUE. On the other hand, "a AND NOT a" is unsatisfiable.

In some embodiments, RPG 201 provides an interface for CAD tools to determine whether a certain decision makes sense. For example, during layout creation, a user may have certain questions regarding positioning of a payload. These questions can be answered by RPG 201, in accordance with some embodiments.

Examples of user queries to RPG 201 may include: Can I put this via here?, If I put this via here, can I fix the violations later?, Can I extend this wire by 'k' nanometers?, If I put this wire here, will the gap around it be fillable later?, If I put this device here, will the diffusion cause a violation?, etc. In some embodiments, RPG 201 uses its rules to answer these user queries. In some embodiments, all the rules in RPG 201 are pattern matched for the whole layout (e.g., the whole layout of an integrated circuit design) to ensure that no rules are violated in the final layout of the integrated circuit design.

Figure 3:
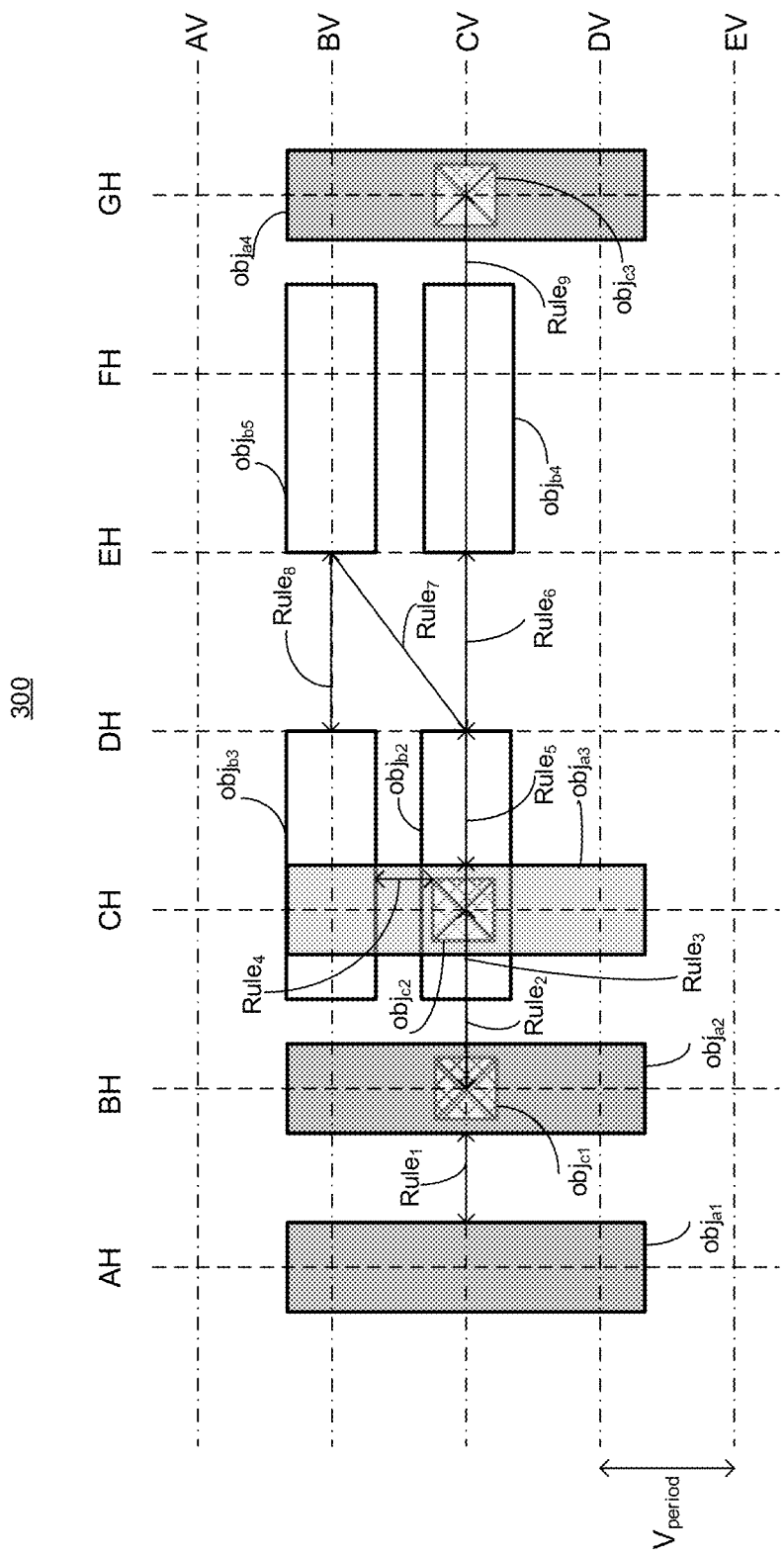
FIG. 3 illustrates a multilayer layout on a grid with various physical objects (or payloads) and rules.

FIG. 3 illustrates multilayer layout 300 on a grid with various physical objects (or payloads) and rules. It is pointed out that those elements of FIG. 3 having the same reference numbers (or names) as the elements of any other figure can operate or function in any manner similar to that described, but are not limited to such.

Here, objects (obj) are laid out on grids (i.e., the dotted horizontal and vertical lines) on various layers forming a three dimensional (3D) layout. In this example, three types of objects are shown—vertical interconnect objects $obj_{a1}$ through $obj_{a4}$, horizontal interconnect objects $obj_{b2}$ through $obj_{b4}$, and via objects $obj_{c1}$ through $obj_{c3}$. Here, objects $obj_{a1}$, $obj_{a2}$, and $obj_{a4}$ are on one layer while $obj_{a2}$ is on a different layer. In this example, objects $obj_{b2}$ through $obj_{b4}$ are on the same layer.

In some embodiments, RPG 201 defines the grid by identifying periods and repetitions between the horizontal and vertical grid lines. For example, RPG 201 is aware of vertical grid lines AH, BH, CH, through GH (and onwards) and the period $H_{period}$ between them. Likewise, RPG 201 is aware of horizontal grid lines AV, BV, through EV (and onwards), and the period $V_{period}$ between them. Since payloads or objects are placed on grids, RPG 201 uses the grid information to determine relative positions of one object with reference to another.

In some embodiments, RPG 201 is also aware of all rules provided by Process node layout rules 101. Examples of these rules include spacing rules between various objects. These rules are identified as $Rule_{1-9}$ in FIG. 3. By having knowledge of the rules and the grids, RPG 201 can provide assessment of various layout configurations and highlight errors or violations. For example, RPG 201 can indicate that a via object is too close to another via object than the allowable distance of separation. In some embodiments, RPG 201 also provides suggestions to the CAD tools (and/or their users) about how to fix the violations.

Figure 4:
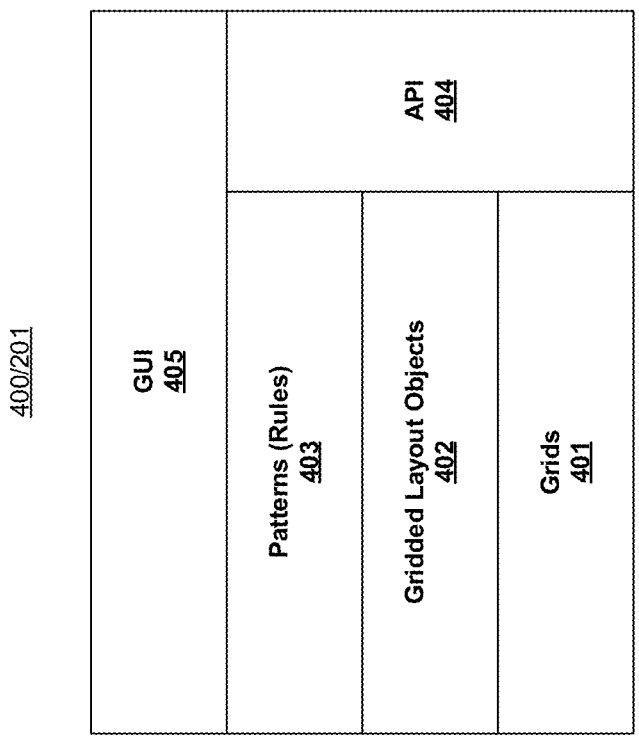
FIG. 4 illustrates components of the RPG, in accordance with some embodiments of the disclosure.
Figure 5A:
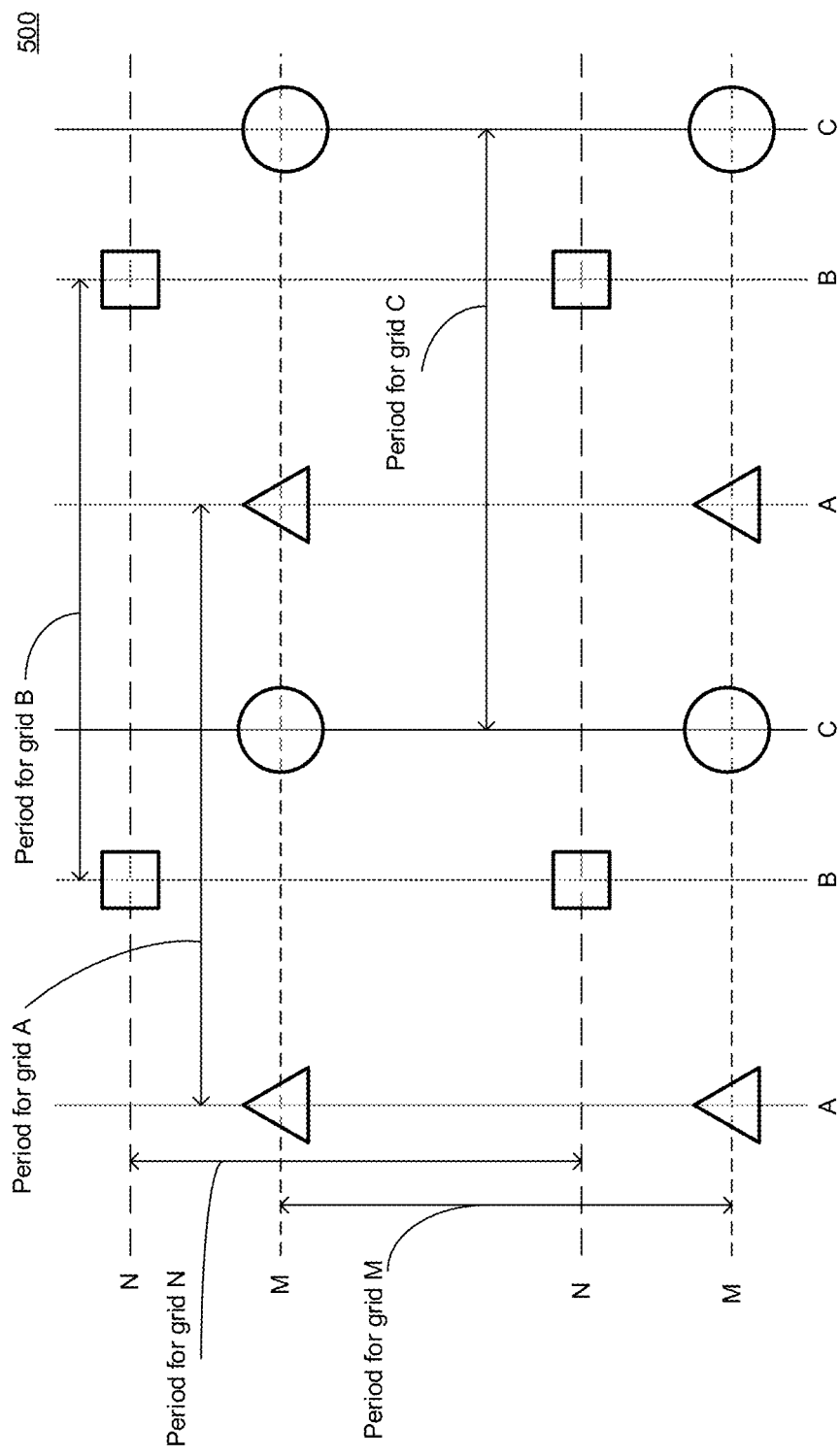
FIGS. 5A-B illustrate a grid with all possible payloads and a layout on the grid with instances of the payloads.
Figure 5B:
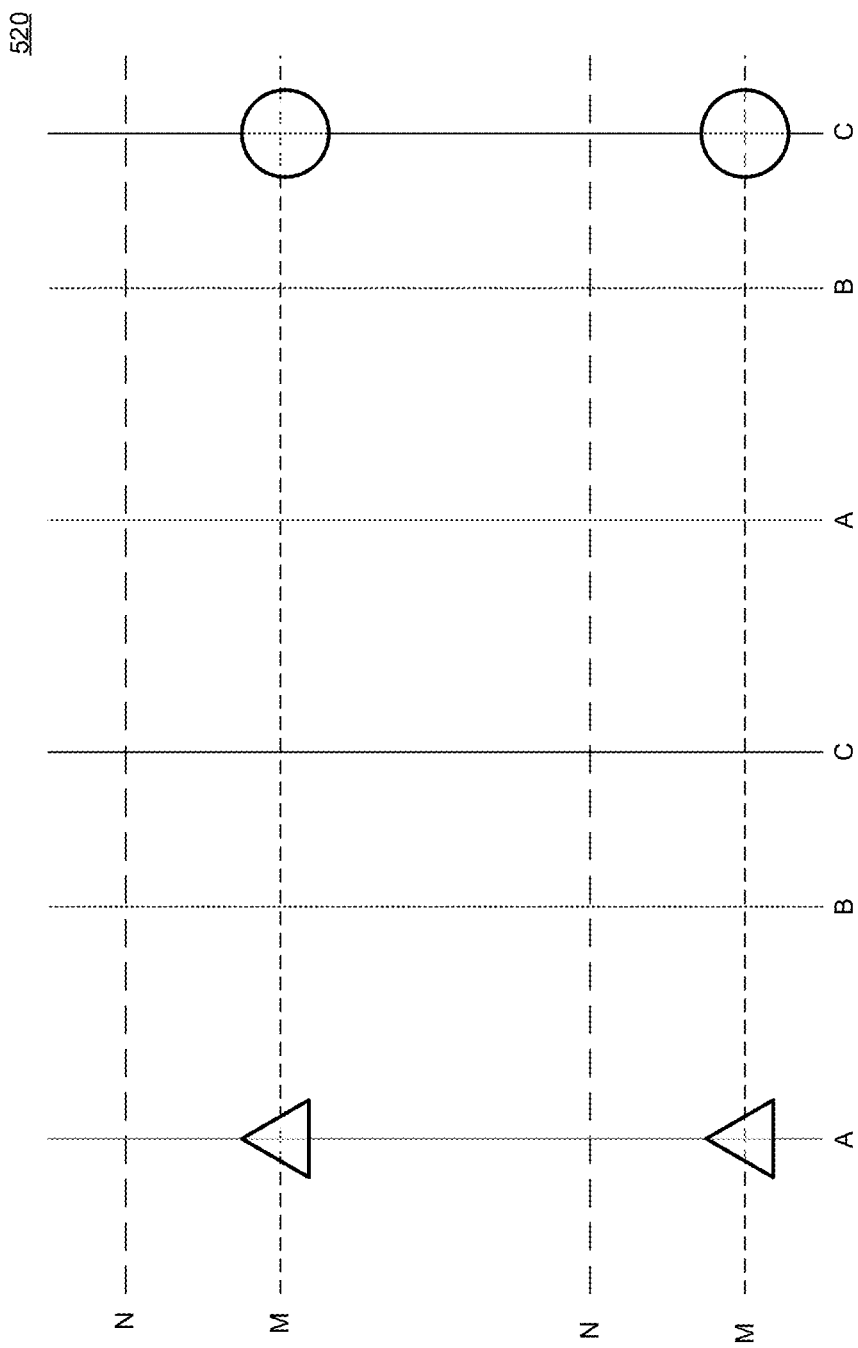

FIG. 4 illustrates components 400 of RPG 201, in accordance with some embodiments of the disclosure. It is pointed out that those elements of FIG. 4 having the same reference numbers (or names) as the elements of any other figure can operate or function in any manner similar to that described, but are not limited to such. FIG. 4 is described with reference to FIGS. 5A-B and FIGS. 6A-B. FIG. 5A illustrates a grid 500 with all possible payloads, FIG. 5B illustrates gridded layout 520 with instances of the payloads from FIG. 5A, while FIGS. 6A-B illustrate RPG pattern 600 and layout 620 that that meet a rule that requires the presence of three neighboring objects, according to some embodiments of the disclosure.

Referring back to FIG. 4, in some embodiments, RPG 400/201 comprises Grids 401 module or logic, Gridded Layout Objects 402 module or logic, Patterns (Rules) 403 module or logic, Application Interface (API) 404 module or logic, and Graphical User Interface (GUI) 405 module or logic. In some embodiments, the various modules are software modules (i.e., machine executable instructions) that are arranged in a design stack.

For example, Grids 401 module is the base layer or base module while other modules are formed above it. In some embodiments, Gridded layout Objects 402 module is formed over Grids 401 module in the sense that Gridded layout Objects 402 module has visibility to functions and attributes of Grids 401 module. In some embodiments, Patterns (Rules) 403 module is formed over Gridded layout Objects 402 module in the sense that Patterns (Rules) 403 module has visibility to functions and attributes of Grids 401 and Gridded layout Objects 402 modules. In some embodiments, API 404 has access to Grids 401, Gridded layout Objects 402, and Patterns 403 modules. In some embodiments, GUI 405 module has access to all modules.

In some embodiments, Grids 401 module or logic defines the component of the grid. For example, Grids 401 module or logic defines the gridlines for all layers, horizontal and vertical periods of the gridlines, and vertical and horizontal offsets between different gridlines. With reference to FIG. 5A, Grids 401 module identifies vertical gridlines 'A', 'B', and 'C', and horizontal grid lines 'N' and 'M'. Here, Grid 401 module also defines Periods for grids 'A', 'B', 'C', 'N' and 'M' as illustrated in FIG. 5A.

Referring back to FIG. 4, in some embodiments, Gridded Layout Objects 402 module or logic maintains a list of all objects or payloads that can associate with one or more components of the grid. For example, Gridded Layout Objects 402 module or logic has a list that maintains payloads that represent devices (e.g., transistors, capacitors, inductors, resistors, diodes, etc.), wires (e.g., interconnects for different layers), vias, contacts, etc. In some embodiments, Gridded Layout Objects 402 module or logic is aware of designated layers for various payloads. For example, Gridded Layout Objects 402 module or logic knows that transistors are to be formed over the substrate and not over metal 2 (M2).

With reference to FIG. 5A, Gridded Layout Objects 402 module or logic identifies objects or payloads associated with various grid lines. For example, Gridded Layout Objects 402 module identifies triangle objects to be associated with the intersection of gridlines 'A' and 'M'. Likewise, Gridded Layout Objects 402 module identifies square objects to be associated with the intersection of gridlines 'B' and 'N', and Gridded Layout Objects 402 module identifies circle objects to be associated with the intersection of gridlines 'C' and 'M'.

While FIG. 5A illustrates that the Periods of grids 'A', 'B', and 'C' are the same, they do not have to be the same. Here, the vertical grid lines 'A', 'B', and 'C' repeat as a group every 'X' period, for example. Likewise, in this example, the horizontal gird lines 'M' and 'N' repeat as a group every 'Y' period. While some gird lines show one object or payload per grid point (i.e., intersection of the vertical and horizontal gridlines), more than one payload can be associated with one grid point. For example, a hexagon payload (not shown) can be present at the intersection of grid lines 'A' and 'M.' As such, grid points can have zero, one or more payloads associated with them.

Referring back to FIG. 4, in some embodiments, Patterns 403 module or logic defines patterns as a spatial and Boolean expression between any arbitrary number of payloads or objects as defined by Gridded Layout Objects 402 module. These rules may define all rules of Process node layout rules 101. As such Patterns 403 module is aware of any complexity of the various permutations of the rules for any defined gridded object, in accordance with some embodiments. For example, Patterns 403 module knows about the grids and the payloads that are used in its expression.

In some embodiments, Patterns (Rules) 403 module implements a pattern expression as a DAG having leaf nodes and nodes. Leaf node is a payload at a given relative spatial location combined with a ULF (unary logic function JUST (i.e., must be present) or NOT (i.e., must be absent)), where the payload is defined by Gridded Layout Objects 402 module. A node is an MLF (multiary logic function such as AND, OR, etc., or a DAG node). A DAG node can point to another Node or a Leaf Node.

In some embodiments, the leaves or nodes of the DAG can store optional Boolean properties (i.e., flags) that can be used to map to various properties such as isPower, isVcc, isFill, isPin, isFloat, isDummy, etc. In some embodiments, if and when (some of) these flags are set, then the leaves in the pattern may only match actual layout objects with corresponding matching layout objects. For example, one leaf could be set to isFill=true and isDummy=false and the rest of the flags are masked off (i.e., ignored). In this example, this leaf in the pattern will only match an actual layout object which is Fill OR is not Dummy.

In some embodiments, when a certain pattern needs to be matched against an actual layout, Pattern (Rules) 403 module knows what payloads are involved and relevant for that particular pattern. In some embodiments, Pattern (Rules) 403 module also knows where on the grid those types of payloads could be present or absent. In some embodiments, Pattern (Rules) 403 module also has an internal caching mechanism that directs RPG 400 to the relevant grid coordinates in the layout.

For each of those relevant locations, in some embodiments, Pattern (Rules) 403 module evaluates the state of each of the leaves (i.e., whether they are present or absent), the Boolean properties and equality variables, and the expression encoded in the DAG of the pattern. If the state evaluates to true, then there is a match at that particular layout location. With reference to FIG. 5A, Patterns 403 module knows the minimum distance between the circle objects from the nearest triangle and square objects. FIG. 5B illustrates gridded layout 520 with instances of the payloads from FIG. 5A. In this example, triangle and circle objects are used for making gridded layout 520. In some embodiments, RPG 400 applies its rules when gridded layout 520 is being made.

Referring back to FIG. 4, in some embodiments, Patterns (Rules) 403 module also manages equality variables. Equality variables are described with reference to FIGS. 6A-B. FIGS. 6A-B illustrate RPG pattern 600 and layout 620 that meets a rule that requires the presence of the three neighboring objects, according to some embodiments of the disclosure. The rule additionally states that the left and middle objects are to have the same net ID (identification), while the right object needs to have a different net ID. This is expressed by the formal net variables N:1, N:1, and N:2 in FIG. 6A and by the actual net IDs in the FIG. 6B. For example, if in FIG. 6B the nets change from N:1, N:1, N:2, N:1, N:2 to N:11, N:11, N:12, N:11, N:12, then the same matching of the formal net IDs N:1 N:1 N:2 is found in the actual net IDs N:11 N:11 N:12.

Here, the rule matches layout 620 in three distinct locations, centered at 'x' coordinate 1. When equality variables are specified, in this case pertaining to NET IDs (N:1 and N:2) on pattern 600, general variables are used to express the need for equality or inequality between leaves of the DAG tree. For the pattern to match, in this example, the left and middle leaves need to have identical NET IDs, where the right leaf needs to have a different one. With these variables specified, in this example the pattern will only match the layout centered at 'x' coordinate 2.

Referring back to FIG. 4, in some embodiments, API 404 provides access to CAD tools with all relevant functions of the various modules. For example, API 404 provides a list of functions or calls that CAD tools can call and access various attributes of the modules.

In some embodiments, GUI 405 also provides a user or CAD tool with visual access to Patterns (Rules) 403. In some embodiments, API 404 and/or GUI 405 provide what-if functionalities to users and/or CAD tools to determine whether and how a certain pattern of objects can be fixed. For example, API 404 and/or GUI 405 can allow a user and/or a CAD tool to ask questions like: Can I put this via here?, If I put this via here, can I fix the violations later?, Can I extend this wire by k nanometers?, If I put this wire here, will the gap around it be fillable later?, If I put this device here, will the diffusion cause a violation?, etc. In some embodiments, RPG 400 evaluates the various branches of the DAG and reports options of layout modifications (e.g., addition, subtraction, and property changes) that, if adopted, would fix the pattern match.

FIGS. 7A-B illustrate grid 700 with instances of payloads, and associated rule 720 modeled in RPG 400, in accordance with some embodiments of the disclosure. Here, the payloads are vias. For illustration purposes, a made-up rule is established in Pattern 403 module. In this example, the rule states that if there are two gray shaded vias (i.e., Via2) in diagonally adjacent locations, then if the number of vias (i.e., Via1) in the immediate neighborhood (i.e., 12 white vias) is greater or equal to 5, then there is a violation. In some embodiments, Pattern 403 module of RPG 400 reflects and rotates this rule as necessary.

FIG. 7B illustrates a graphical representation of rule model 720 after the rule is translated to SAT (satisfiability) Boolean constraints in a CNF (conjunctive normal form) and fed to SAT solver 204. Here, the Boolean operations are AND (between via types Via1 and Via2) and greater than or equal to (GTE) than five (GTE5). In some embodiments, all the RPG rules are pattern matched for the whole layout to ensure that no rules are violated in the final layout.

Figure 8A:
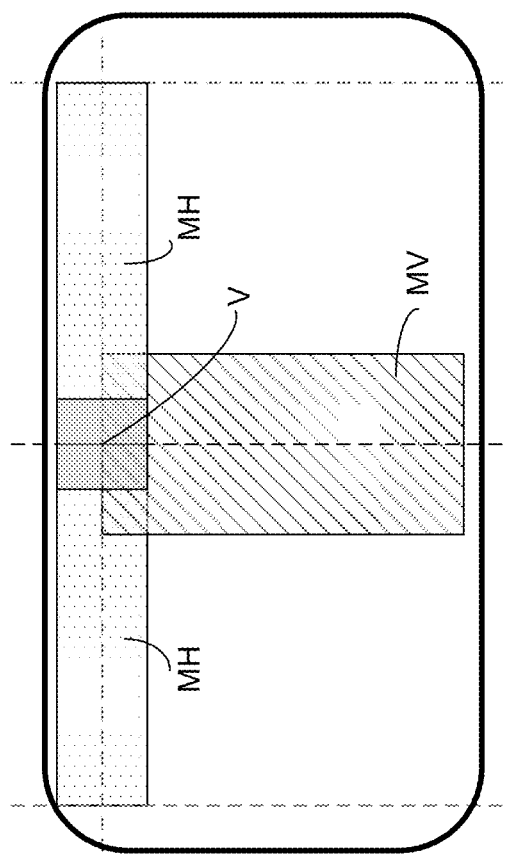
FIGS. 8A-B illustrate a grid with instances of payloads, and associated rules modeled in RPG, in accordance with some embodiments of the disclosure.
Figure 8B:
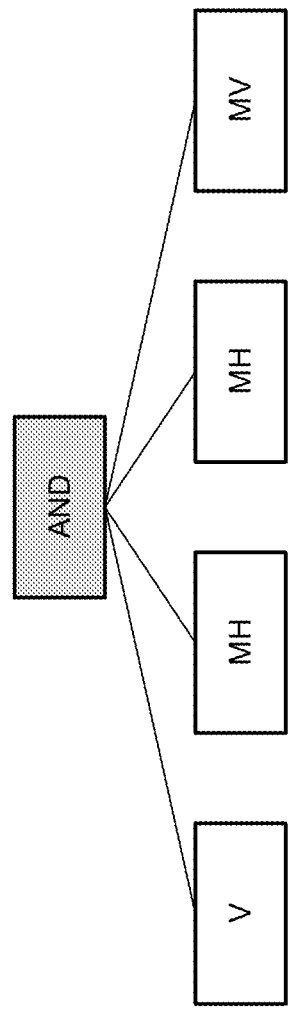
Figure 9:
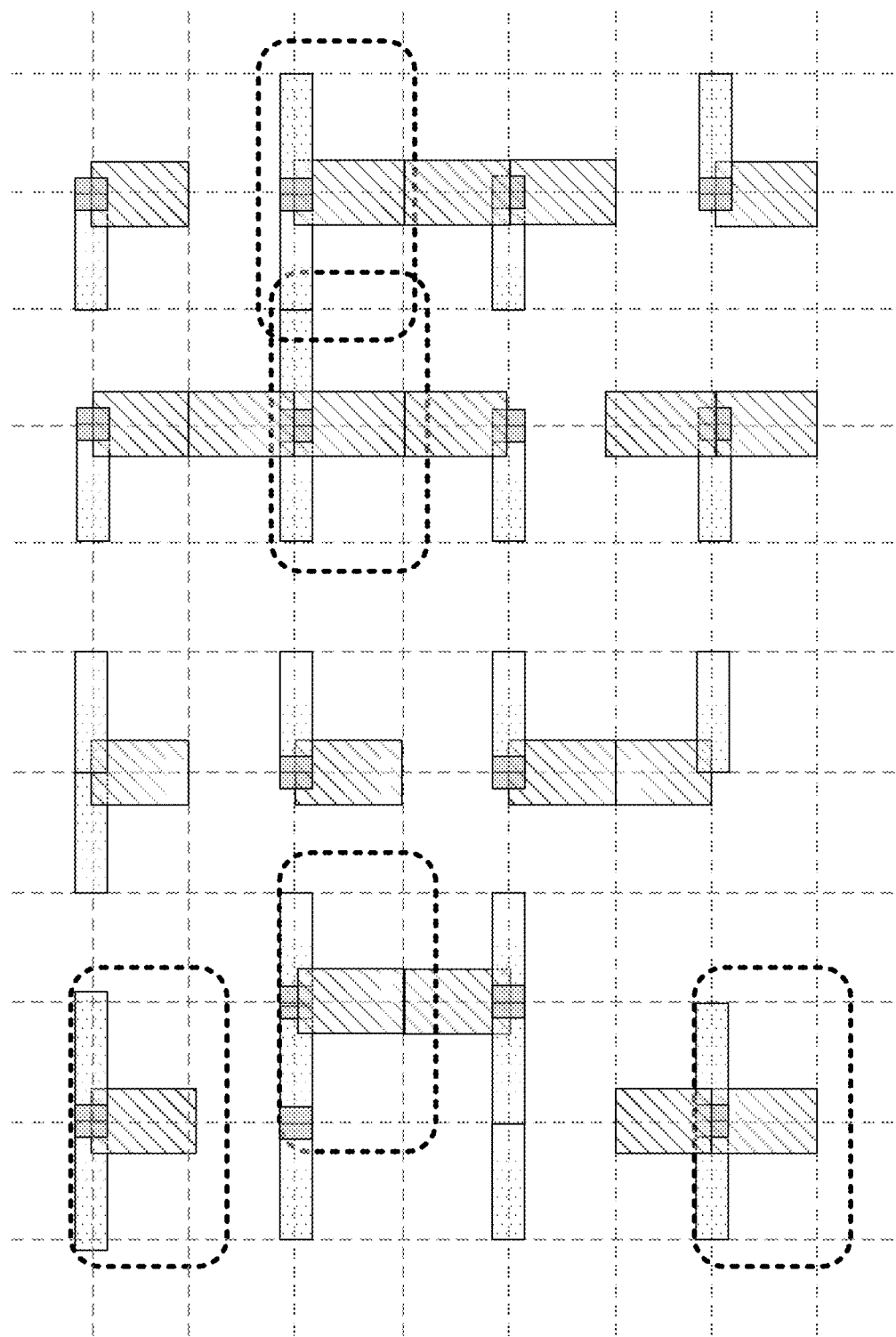
FIG. 9 illustrates a grid with various instances of payloads, with some identified by RPG as meeting the rule described with reference to FIG. 8B, according to some embodiments of the disclosure.

FIGS. 8A-B illustrate grid showing layout 800 with instances of payloads, and associated rule 820 modeled in RPG 400, in accordance with some embodiments of the disclosure. It is pointed out that those elements of FIGS. 8A-B having the same reference numbers (or names) as the elements of any other figure can operate or function in any manner similar to that described, but are not limited to such. FIGS. 8A-B and FIG. 9 illustrate an example of another working model of RPG 400.

Layout 800 shows horizontal interconnect components MH, via V, and vertical interconnect component MV. The dotted lines are the horizontal and vertical grids. In this example, via V is formed at the intersection of horizontal and vertical grids, MH extends from one vertical grid to another vertical grid along a horizontal grid, and MV extends from one horizontal grid to another horizontal grid along a vertical grid. FIG. 8B illustrates an associated visual rule 820 for layout 800. Here, the rule is satisfied if at a grid point, there are via V, two MHs, and a MV present—hence the AND function. This rule is part of Patterns 403, in accordance with some embodiments.

FIG. 9 illustrates grid 900 with various instances of payloads, with some identified by RPG 400 as meeting the rule described with reference to FIG. 8B, according to some embodiments of the disclosure. It is pointed out that those elements of FIG. 9 having the same reference numbers (or names) as the elements of any other figure can operate or function in any manner similar to that described, but are not limited to such. Here, the rectangular dotted regions illustrate where rule 820 is satisfied. In some embodiments, GUI 405 of RPG 400 identifies a combination of payloads that meet rule 820. Alternatively, GUI 405 can identify a combination of payloads that do not meet rule 820. In some embodiments, GUI 405 places a colorful identifier(s) to the layout 900 to indicate the patterns of payloads that meet rule 820 or did not meet rule 820.

RPG 400 is to layout what "regexp" in TCL or PERL programming languages is to strings. For example: in TCL a search expression can be expressed as:

set t "ak3ab1xf2abbac4abcdac1"
set matches [regexp-all-inline {a[bc][1-4]} $t]

The search result will result in finding the following bold and underlined pattern matches:

"ak3ab1xf2abbac4abcdac1"

Just like the above example of "regexp," RPG 400 finds the patterns shown in the dotted regions that match the rule 820 in FIG. 8B, in accordance with some embodiments.

Figure 10:
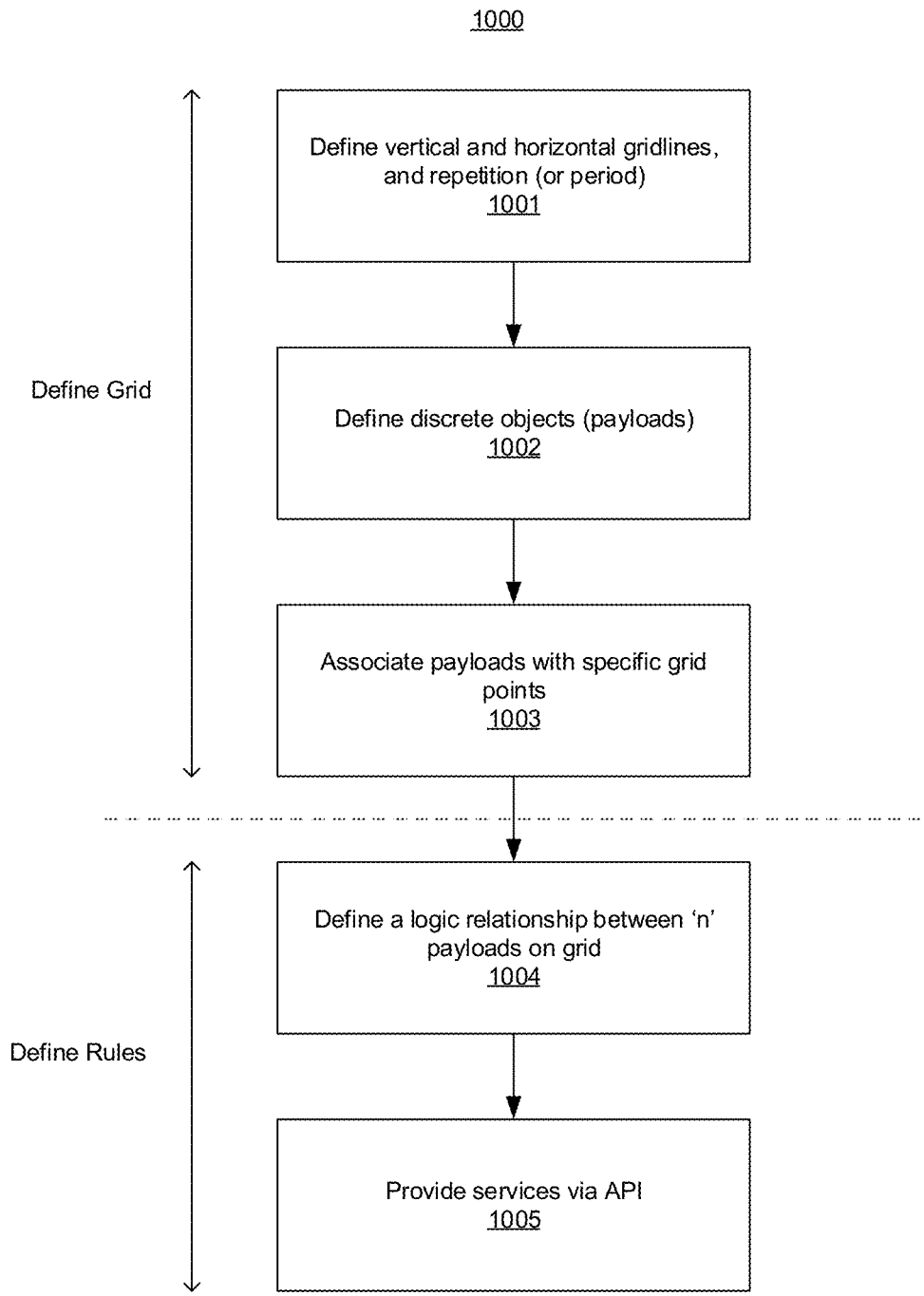
FIG. 10 illustrates a flowchart of a method for forming the RPG having a CAD tool interface, according to some embodiments of the disclosure.

FIG. 10 illustrates flowchart 1000 of a method for forming RPG 400 having CAD tool interface(s), according to some embodiments of the disclosure. It is pointed out that those elements of FIG. 10 having the same reference numbers (or names) as the elements of any other figure can operate or function in any manner similar to that described, but are not limited to such.

Although the blocks in the flowchart with reference to FIG. 10 are shown in a particular order, the order of the actions can be modified. Thus, the illustrated embodiments can be performed in a different order, and some actions/blocks may be performed in parallel. Some of the blocks and/or operations listed in FIG. 10 are optional in accordance with certain embodiments. The numbering of the blocks presented is for the sake of clarity and is not intended to prescribe an order of operations in which the various blocks must occur. Additionally, operations from the various flows may be utilized in a variety of combinations.

Blocks 1001 through 1003 define a grid and its various attributes while blocks 1004 and 1005 define rules for the various payloads to be placed on the grid. Flowchart 1000 illustrates a simplified process which is described in detail with reference to the various embodiments and so it is not repeated in detail.

At block 1001, Grids 401 module of RPG 400 defines vertical and horizontal gridlines and their attributes (e.g., repetition (or periods), offsets, etc.). At block 1002, Grids Layout Objects 402 module defines all possible payloads (e.g., active and passive devices, wires, vias, contacts, etc.). At block 1003, Grids Layout Objects 402 module associates payloads with specific grid points. In some embodiments, Gridded Layout Objects 402 module or logic is aware of designated layers for various payloads. For example, Gridded Layout Objects 402 module or logic knows metal 2 (M2) runs horizontally while metal 3 (M3) runs perpendicular to M2.

At block 1004, Patterns 403 module defines a logic relationship between 'n' payloads on grid, where 'n' is a number greater than one. In some embodiments, Patterns 403 module or logic defines patterns as a spatial and Boolean expression between any arbitrary number of payloads or objects as defined by Gridded Layout Objects 402 module. These rules may define all rules of Process node layout rules 101. As such Patterns 403 module is aware of any complexity of the various permutations of the rules for any defined gridded object, in accordance with some embodiments. For example, Patterns 403 module 401 knows about the grid and the payloads that are used in its expression.

At block 1005, API 404 and GUI 405 module provide functional and visual access to Patterns (Rules) 403, respectively, to CAD tools and/or users. In some embodiments, API 404 provides access to CAD tools with all relevant functions of the various modules. For example, API 404 provides a list of functions or calls that CAD tools can call and access various attributes of the modules. In some embodiments, GUI 405 also provides a user or CAD tool with visual access to Patterns (Rules) 403. In some embodiments, API 404 and/or GUI 405 provide what-if functionalities to users and/or CAD tools to determine whether and how a certain pattern of objects can be fixed.

In some embodiments, a method of forming a layout of for an integrated circuit (IC) design (e.g., a processor) is provided. In some embodiments, the layout is formed using a plurality of CAD tools (e.g., place and route tool, layout synthesis tool, etc.). In some embodiments, the method comprises providing at least two CAD tools of the plurality with an interface (e.g., API 404) to a unified tool (e.g., RPG 400). In some embodiments, the unified tool is operable to provide the at least two CAD tools with access to rules (e.g., defined by Patterns 403 module) associated with a process node (e.g., a 7 nm CMOS processing technology node).

In some embodiments, the unified tool is operable to translate the rules to satisfiability Boolean constraints in a conjunctive normal form, where the rules define a relationship between the plurality of objects with reference to defined properties of a layout grid, and where the layout grid provides a 3D space for organizing a plurality of objects on the layout grid. In some embodiments, the method comprises fabricating the layout using a fabricating technology for the process node. As such, the unified tool can improve time to market of the IC by providing various CAD tools from different vendors a simplified way to access changing process node rules.

Figure 11:
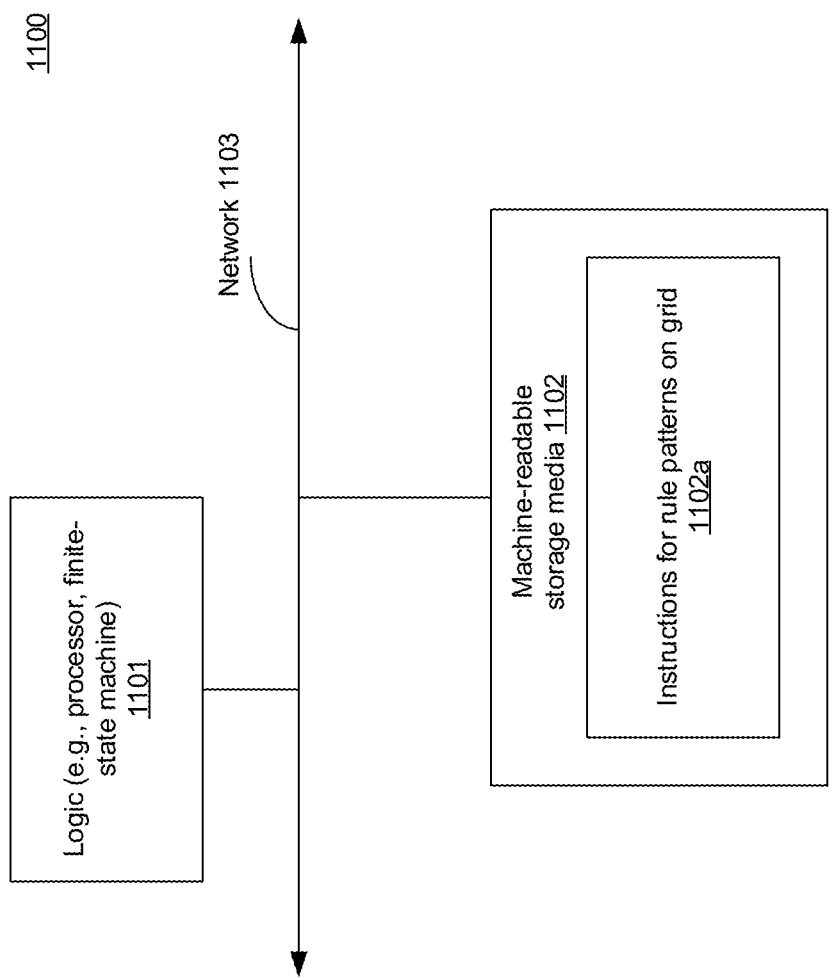
FIG. 11 illustrates a system having a machine-readable storage media for storing instructions that when executed by one or more processors perform the method of FIG. 10, in accordance with some embodiments of the disclosure.

FIG. 11 illustrates a system 1100 (or host 1100) having a machine-readable storage media for storing instructions that when executed perform the method of FIG. 10, in accordance with some embodiments of the disclosure. It is pointed out that those elements of FIG. 11 having the same reference numbers (or names) as the elements of any other figure can operate or function in any manner similar to that described, but are not limited to such.

In some embodiments, system 1100 comprises Logic 1101 (e.g., processor or finite state machine) and machine-readable storage media 1102 coupled to Network 1103. In some embodiments, Logic 1101 is a microcontroller (e.g., a processor or a finite state machine) which is operable to execute instructions for RPG.

Program software code/instructions 1102a associated with flowchart 1000 (and various other embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor.

In some embodiments, the program software code/instructions 1102a associated with flowchart 1000 are stored in a computer executable storage medium 1102 and executed by Logic 1101. Here, computer executable storage medium 1102 is a tangible machine readable medium that can be used to store program software code/instructions 1102a and data that, when executed by a computing device, causes one or more processors to perform a method(s) as may be recited in one or more accompanying claims directed to the disclosed subject matter.

The tangible machine readable medium 1102 may include storage of the executable software program code/instructions 1102a and data in various tangible locations, including for example ROM, volatile RAM, non-volatile memory and/or cache and/or other tangible memory as referenced in the present application. Portions of this program software code/instructions and/or data 1102a may be stored in any one of these storage and memory devices. Further, the program software code/instructions 1102a can be obtained from other storage, including, e.g., through centralized servers or peer to peer networks and the like, including the Internet. Different portions of the software program code/instructions and data can be obtained at different times and in different communication sessions or in the same communication session.

The software program code/instructions 1102a (associated with flowchart 1000) and data can be obtained in their entirety prior to the execution of a respective software program or application by the computing device. Alternatively, portions of the software program code/instructions 1102a and data can be obtained dynamically, e.g., just in time, when needed for execution. Alternatively, some combination of these ways of obtaining the software program code/instructions 1102a and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media 1102 include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The software program code/instructions 1102a may be temporarily stored in digital tangible communication links while implementing electrical, optical, acoustical or other forms of propagating signals, such as carrier waves, infrared signals, digital signals, etc. through such tangible communication links.

In general, a tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, Blackberry® Droid®, or the like, or any other device including a computing device. In one embodiment, processor-based system is in a form of or included within a PDA, a cellular phone, a notebook computer, a tablet, a game console, a set top box, an embedded system, a TV, a personal desktop computer, etc. Alternatively, the traditional communication applications and subsidized application(s) may be used in some embodiments of the disclosed subject matter.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, a machine-readable storage media is provided having one or more machine executable instructions stored there on that when executed cause one or more processors to perform an operation comprising: define properties of a layout grid, wherein the layout grid provides a three dimensional (3D) space for organizing a plurality of objects on the layout grid; and define rules for the plurality of objects, wherein the rules define a relationship between the plurality of objects with reference to the defined properties of the layout grid.

In some embodiments, the machine-readable storage media has further one or more machine executable instructions stored there on, that when executed, cause the one or more processors to perform a further operation comprising: provide an application interface (API) for a plurality of drawing tools, wherein the API applies the defined rules and properties in response to user queries. In some embodiments, the API provides at least one of: indication whether a proposed modification to a position of an object, from the plurality of objects, satisfies the defined rules; or option to fix a rule violation.

In some embodiments, the machine-readable storage media has further one or more machine executable instructions stored there on, that when executed, cause the one or more processors to perform a further operation comprising: translate the defined rules to satisfiability Boolean constraints in a conjunctive normal form; and input the translated defined rules to a satisfiability solver. In some embodiments, the operation of defining properties of the layout grid comprises: define vertical and horizontal gridlines on the layout grid; and define repetition or period of the vertical and horizontal gridlines.

In some embodiments, the operation of defining the rules for the plurality of objects comprises: defining a pattern for the plurality of objects as a spatial and Boolean expression between the plurality of objects. In some embodiments, the pattern is implemented as a Directed Acyclic Graph having nodes and leafs. In some embodiments, each leaf comprises an object, from the plurality of objects, with spatial information. In some embodiments, each node implements at least one of a multiary logic function or a unary logic function. In some embodiments, the plurality of objects include: interconnect wires, vias, contacts, and devices.

In another example, an apparatus is provided which comprises: a memory for storing: properties of a layout grid, wherein the layout grid provides a three dimensional (3D) space for organizing a plurality of objects on the layout grid; rules for the plurality of objects, wherein the rules define a relationship between the plurality of objects with reference to the defined properties of the layout grid; and a processor coupled to the memory, the processor operable to: translate the rules to satisfiability Boolean constraints in a conjunctive normal form; and input the translated defined rules to a satisfiability solver.

In some embodiments, the plurality of objects include: interconnect wires, vias, contacts, and devices. In some embodiments, wherein the defined properties of the layout grid include: vertical and horizontal gridlines on the layout grid; and define repetition or period of the vertical and horizontal gridlines. In some embodiments, the rules include: a pattern for the plurality of objects as a spatial and Boolean expression between the plurality of objects.

In another example, a method is provided which comprises: forming a layout for an integrated circuit (IC) design using a plurality of computer aided design (CAD) tools; providing at least two CAD tools of the plurality with an interface to a unified tool, wherein the unified tool is operable to: provide the at least two CAD tools with access to rules associated with a process node; and translate rules to satisfiability Boolean constraints in a conjunctive normal form, wherein the rules define a relationship between the plurality of objects with reference to defined properties of a layout grid, and wherein the layout grid provides a three dimensional (3D) space for organizing a plurality of objects on the layout grid; and fabricating the layout using a fabricating technology for the process node.

In some embodiments, the plurality of objects include: interconnect wires, vias, contacts, and devices. In some embodiments, at least one of the CAD tools is a place and route tool. In some embodiments, the unified tool is operable to provide an application interface (API) for the at least two CAD tools, and wherein the API applies the defined rules and properties in response to user queries. In some embodiments, the API provides at least one of: indication whether a proposed modification to a position of an object, from the plurality of objects, satisfies the defined rules; or option to fix a rule violation. In some embodiments, the unified tool is operable to defining a pattern or rule for the plurality of objects as a spatial and Boolean expression between the plurality of objects, and wherein the pattern is implemented as a Directed Acyclic Graph having nodes and leafs.

In another example, a method is provided which implemented by a computer. In some embodiments, the method comprises: defining properties of a layout grid, wherein the layout grid provides a three dimensional (3D) space for organizing a plurality of objects on the layout grid; and defining rules for the plurality of objects, wherein the rules define a relationship between the plurality of objects with reference to the defined properties of the layout grid. In some embodiments, the method comprises: providing an application interface (API) for a plurality of drawing tools, wherein the API applies the defined rules and properties in response to user queries.

In some embodiments, the API provides at least one of: indication whether a proposed modification to a position of an object, from the plurality of objects, satisfies the defined rules; or option to fix a rule violation. In some embodiments, the method comprises: translating the defined rules to satisfiability Boolean constraints in a conjunctive normal form; and inputting the translated defined rules to a satisfiability solver. In some embodiments, defining properties of the layout grid comprises: defining vertical and horizontal gridlines on the layout grid; and defining repetition or period of the vertical and horizontal gridlines.

In some embodiments, defining the rules for the plurality of objects comprises: defining a pattern for the plurality of objects as a spatial and Boolean expression between the plurality of objects. In some embodiments, the pattern is implemented as a Directed Acyclic Graph having nodes and leafs. In some embodiments, each leaf comprises an object, from the plurality of objects, with spatial information. In some embodiments, each node implements at least one of a multiary logic function or a unary logic function. In some embodiments, the plurality of objects include: interconnect wires, vias, contacts, and devices.

In another example, an apparatus is provided which comprises: means for defining properties of a layout grid, wherein the layout grid provides a three dimensional (3D) space for organizing a plurality of objects on the layout grid; and means for defining rules for the plurality of objects, wherein the rules define a relationship between the plurality of objects with reference to the defined properties of the layout grid. In some embodiments, the apparatus comprises: means for providing an application interface (API) for a plurality of drawing tools, wherein the API applies the defined rules and properties in response to user queries.

In some embodiments, the API provides at least one of: indication whether a proposed modification to a position of an object, from the plurality of objects, satisfies the defined rules; or option to fix a rule violation. In some embodiments, the apparatus comprises: means for translating the defined rules to satisfiability Boolean constraints in a conjunctive normal form; and means for inputting the translated defined rules to a satisfiability solver. In some embodiments, the means for defining properties of the layout grid comprises: means for defining vertical and horizontal gridlines on the layout grid; and means for defining repetition or period of the vertical and horizontal gridlines.

In some embodiments, the means for defining the rules for the plurality of objects comprises: means for defining a pattern for the plurality of objects as a spatial and Boolean expression between the plurality of objects. In some embodiments, the pattern is implemented as a Directed Acyclic Graph having nodes and leafs. In some embodiments, each leaf comprises an object, from the plurality of objects, with spatial information. In some embodiments, each node implements at least one of a multiary logic function or a unary logic function. In some embodiments, the plurality of objects include: interconnect wires, vias, contacts, and devices.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A machine-readable storage media having one or more machine executable instructions stored there on that when executed cause one or more processors to perform an operation comprising:
define properties of a layout grid, wherein the layout grid provides a three dimensional (3D) space for organizing a plurality of objects on the layout grid; and
define rules for the plurality of objects, wherein the rules define a relationship between the plurality of objects with reference to the defined properties of the layout grid;
translate the defined rules to satisfiability Boolean constraints in a conjunctive normal form, wherein the rules define a relationship between the plurality of objects with reference to defined properties of a layout grid wherein the plurality of objects include one of: interconnect wires, vias, contacts, or devices; and
input the translated defined rules to a satisfiability solver, wherein the translated defined rules provide support for technology process nodes without re-writing Computer Aided Design (CAD) tools.

2. The machine-readable storage media of claim 1 having further one or more machine executable instructions stored there on, that when executed, cause the one or more processors to perform a further operation comprising:
provide an application interface (API) for a plurality of drawing tools, wherein the API applies the defined rules and properties in response to user queries.

3. The machine-readable storage media of claim 2, wherein the API provides at least one of:
indication whether a proposed modification to a position of an object, from the plurality of objects, satisfies the defined rules; or
option to fix a rule violation.

4. The machine-readable storage media of claim 1, wherein the operation of defining properties of the layout grid comprises:
define vertical and horizontal gridlines on the layout grid; and
define repetition or period of the vertical and horizontal gridlines.

5. The machine-readable storage media of claim 1, wherein the operation of defining the rules for the plurality of objects comprises:
defining a pattern for the plurality of objects as a spatial and Boolean expression between the plurality of objects.

6. The machine-readable storage media of claim 5, wherein the pattern is implemented as a Directed Acyclic Graph having nodes and leafs.

7. The machine-readable storage media of claim 5, wherein each leaf comprises an object, from the plurality of objects, with spatial information.

8. The machine-readable storage media of claim 5, wherein each node implements at least one of a multiary logic function or a unary logic function.

9. An apparatus to generate rules between any number of layout objects on a layout grid, the apparatus comprising:
a memory for storing:
properties of the layout grid, wherein the layout grid provides a three dimensional (3D) space for organizing a plurality of objects on the layout grid;
rules for the plurality of objects, wherein the rules define a relationship between the plurality of objects with reference to the defined properties of the layout grid; and
a processor coupled to the memory, the processor operable to:
translate the rules to satisfiability Boolean constraints in a conjunctive normal form, wherein the rules define a relationship between the plurality of objects with reference to defined properties of a layout grid, wherein the plurality of objects include one of: interconnect wires, vias, contacts, or devices; and
input the translated defined rules to a satisfiability solver, wherein the translated defined rules provide support for technology process nodes without re-writing Computer Aided Design (CAD) tools.

10. The apparatus of claim 9, wherein the defined properties of the layout grid include:
vertical and horizontal gridlines on the layout grid; and
define repetition or period of the vertical and horizontal gridlines.

11. The apparatus of claim 9, wherein the rules include:
a pattern for the plurality of objects as a spatial and Boolean expression between the plurality of objects.

12. A method comprising:
forming a layout for an integrated circuit (IC) design using a plurality of computer aided design (CAD) tools;
providing at least two CAD tools of the plurality with an interface to a unified tool, wherein the unified tool is operable to:
provide the at least two CAD tools with access to rules associated with a process node; and
translate rules to satisfiability Boolean constraints in a conjunctive normal form, wherein the rules define a relationship between the plurality of objects with reference to defined properties of a layout grid, and wherein the layout grid provides a three dimensional (3D) space for organizing a plurality of objects on the layout grid; and
fabricating the layout using a fabricating technology for the process node.

13. The method of claim 12, wherein the plurality of objects include: interconnect wires, vias, contacts, and devices.

14. The method of claim 12, wherein at least one of the CAD tools is a place and route tool.

15. The method of claim 12, wherein the unified tool is operable to provide an application interface (API) for the at least two CAD tools, and wherein the API applies the defined rules and properties in response to user queries.

16. The method of claim 15, wherein the API provides at least one of:
indication whether a proposed modification to a position of an object, from the plurality of objects, satisfies the defined rules; or
option to fix a rule violation.

17. The method of claim 12, wherein the unified tool is operable to defining a pattern or rule for the plurality of objects as a spatial and Boolean expression between the plurality of objects, and wherein the pattern is implemented as a Directed Acyclic Graph having nodes and leafs.

* * * * *